United States Patent
Bradford (10) Patent No.: US 8,600,716 B2
(45) Date of Patent: Dec. 3, 2013

(54) METHOD FOR UPDATING A MODEL OF THE EARTH USING MICROSEISMIC MEASUREMENTS

(75) Inventor: Ian Bradford, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1025 days.

(21) Appl. No.: 11/759,070

(22) Filed: Jun. 6, 2007

(65) Prior Publication Data

US 2008/0004847 A1 Jan. 3, 2008

(30) Foreign Application Priority Data

Jun. 28, 2006 (GB) .................................. 0612779.9

(51) Int. Cl.
*G06G 7/48* (2006.01)
*G01V 1/40* (2006.01)
*G01V 3/18* (2006.01)
*G01V 5/04* (2006.01)
*G01V 9/00* (2006.01)
*G01V 1/00* (2006.01)
*G01V 1/28* (2006.01)
*G01N 15/08* (2006.01)

(52) U.S. Cl.
USPC .................. 703/10; 702/11; 702/12; 702/13; 702/14; 367/25

(58) Field of Classification Search
USPC .............................. 703/10; 367/25; 702/11–14
See application file for complete search history.

(56) References Cited

U.S. PATENT DOCUMENTS

| 4,969,130 A * | 11/1990 | Wason et al. .................... 367/73 |
| 5,377,104 A * | 12/1994 | Sorrells et al. .................. 702/11 |
| 6,278,949 B1 * | 8/2001 | Alam ............................... 702/16 |
| 6,317,695 B1 * | 11/2001 | Zhou et al. ...................... 702/17 |
| 6,462,549 B1 * | 10/2002 | Curtis et al. .................... 324/323 |
| 6,766,254 B1 * | 7/2004 | Bradford et al. ................... 702/9 |
| 6,856,575 B2 | 2/2005 | Jones |
| 6,947,843 B2 | 9/2005 | Fisher et al. |
| 6,981,550 B2 | 1/2006 | Håheim et al. |
| 7,181,380 B2 * | 2/2007 | Dusterhoft et al. ............. 703/10 |
| 7,451,812 B2 * | 11/2008 | Cooper et al. ............. 166/250.1 |
| 7,953,587 B2 * | 5/2011 | Bratton et al. .................. 703/10 |
| 2004/0008580 A1 * | 1/2004 | Fisher et al. .................... 367/56 |
| 2005/0190649 A1 | 9/2005 | Eisner et al. |
| 2005/0234690 A1 | 10/2005 | Mainguy et al. |
| 2007/0255500 A1 * | 11/2007 | Pita et al. ........................ 702/11 |
| 2007/0272407 A1 * | 11/2007 | Lehman et al. ............ 166/250.1 |
| 2007/0294034 A1 * | 12/2007 | Bratton et al. .................... 702/6 |

FOREIGN PATENT DOCUMENTS

| GB | 2 354 852 A | 4/2001 |
| WO | WO 2004/070424 A1 | 8/2004 |
| WO | WO 2005/006020 A1 | 1/2005 |

OTHER PUBLICATIONS

James Albright, "Seismic Surveillance for Monitoring Reservoir Changes", 1994.*
Of David Amitrano, "From diffuse to localized damage through elastic interaction", 1999.*

(Continued)

*Primary Examiner* — Omar Fernandez Rivas
*Assistant Examiner* — Angel Calle (57) ABSTRACT

A method for updating an earth model with fractures or faults using a microseismic data using mechanical attributes of an identified faults or fracture by matching a failure criterion to observed microseismic events for an identified fault or fracture.

31 Claims, 11 Drawing Sheets

(56) References Cited

OTHER PUBLICATIONS

D. Lockner, NPL publication, "The role of Acoustic emission in the study of rock fracture", Pergamon Press, 1993.*

Jerome Weiss et al., "Acoustic Emission in Single Crystals of Ice," J. Phys. Chem. B, 1997, vol. 101: pp. 6113-6117.

J. Thewlis, "Concise Dictionary of Physics and related subjects," Pergamon Press, New York, 1973, See entry for 'Friction, Angle of:' p. 142.

Takayuki Hirata et al., "Fractal structure of spatial distribution of microfracturing in rock," Geophys. J. R. astr. Soc., 1987, vol. 90: pp. 369-374.

S. J. Cox et al., "Microcrack Formation and Material Softening in Rock Measured by Monitoring Acoustic Emissions," Int. J. Rock Mech. Min. Sci. & Geomech. Abstr., 1993, vol. 30(1): pp. 11-24.

"The Penguin Dictionary of Physics," Market House Books Ltd., Penguin Books, New York, 1977, See entry for 'Angle of Friction:' p. 13.

D. Lockner, "The Role of Acoustic Emission in the Study of Rock Fracture," Int. J. Rock Mech. Min. Sci. & Geomech. Abstr., 1993, vol. 30(7): pp. 883-899.

Ali et al: "Watching rocks change—mechanical earth modeling", Schlumberger Oilfield Review, Summer 2003, pp. 22-39.

Bartberger et al: "Is there a basin-centered gas accumulation in Cotton Valley Group Sandstones, Gulf Coast Basin, U.S.A.?", U.S. Geological Survey Bulletin 2184-D, U.S. Department of Energy, National Energy Technology Laboratory, Morgantown, W. Va,, Feb. 2002.

Dake: "Some basic concepts in reservoir engineering", Fundamentals of Reservoir Engineering, Developments in Petroleum Science 8, Elsevier Scientific Publishing Company, Amsterdam 1978, pp. 1-43.

Pinnacle Technologies, Inc: "Cotton Valley fracture imaging project phase III", Final Report for JIP Consortium, Jul. 9, 1999 (Well CGU 22-9, Carthage Field, Cotton Valley Formation, Carthage, Texas, Apr. 1998-May 1999).

Plumb et al: "The mechanical earth model concept and its application to high-risk well construction projects", IADC/SPE Drilling Conference, New Orleans, Louisiana, Feb. 23-25, 2000, IADC/SPE 59128.

Richardson: "Completion and stimulation practices in the prolific Cotton Valley Reef trend of east Texas", SPE Annual Technical Conference and Exhibition, New Orleans, Louisiana, Sep. 27-30, 1998, SPE 49049.

Rutledge et al: "Faulting induced by forced fluid injection and fluid flow forced by faulting: an interpretation of hydraulic-fracture microseismicity, Carthage Cotton Valley gas field, Texas", Bulletin of the Seismological Society of America, vol. 94, No. 5, pp. 1817-1830.

Rutledge et al: "Hydraulic stimulation of natural fractures as revealed by induced microearthquakes, Carthage Cotton Valley gas field, east Texas", Geophysics, vol. 68, No. 2, 2003, pp. 441-452.

Settari et al: "3-D analysis and prediction of microseismicity in fracturing by coupled geomechanical modeling", SPE Gas Technology Symposium, Calgary, Alberta, Apr. 30-May 2, 2002, SPE 75714.

* cited by examiner

METHOD FOR UPDATING A MODEL OF THE EARTH USING MICROSEISMIC MEASUREMENTS

FIELD OF THE INVENTION

The present invention relates to the field of drilling oil and gas wells. In particular, the invention relates to a method for updating an earth model using microseismic data or measurements.

CROSS-REFERENCE TO RELATED APPLICATIONS

This application claims the benefits of priority from Application Number 0612779.9, entitled "METHOD FOR UPDATING A MODEL OF THE EARTH USING MICROSEISMIC MEASUREMENTS," filed in the United Kingdom on Jun. 28, 2006. This application is commonly assigned to assignee of the present invention and hereby incorporated by reference in its entirety.

BACKGROUND OF THE INVENTION

Earth models contain data which characterise the properties of, and surfaces bounding, the geological features which form the earth's sub-surface, such as rock formations and faults. They are used to assist operations occurring in the earth's sub-surface, such as the drilling of an oil or gas well, or the development of a mine.

The domain of applicability of an earth model varies greatly and should be considered on a case by case basis. Some earth models are applicable only in the near vicinity of a particular oil or gas well, or mine. Others may be valid for an entire oil or gas field, or perhaps even over a region such as the North Sea or Gulf of Mexico.

The data in an earth model consists of measurements gathered during activities such as the seismic, logging or drilling operations of the oil and gas industry, and of interpretations made from these measurements. The data may be gathered above, on, or below the earth's surface. As the duration or number of sub-surface operations increases, more data is gathered. This data can be used to amend the relevant earth model, with the aim that it should characterise the geology and properties ever more accurately. Clearly, it will be conducive to the efficiency of these operations if amendments which enhance the accuracy of the earth model are made as quickly as possible, or appropriate.

The U.S. Pat. No. 6,766,254 summarizes the recent methods for updating an earth model off-line and in real-time. For the purpose of providing background information to the present invention, the content of the patent is fully incorporated herein.

Microseismic measurements can be characterized as a variant of seismics. In conventional seismic explorations a seismic source, such as airguns, vibrators or explosives, is activated and generate sufficient acoustic energy to penetrate the earth. Reflected or refracted parts of this energy are then recorded by seismic receivers such as hydrophones and geophones.

In passive seismic or microseismic monitoring there is no actively controlled and triggered source. The seismic energy is generated through so-called microseismic events caused by subterranean shifts and changes that at least partially give rise to acoustic waves which in turn can be recorded using suitable receivers. Relevant background information on instruments and methods can be found for example in the U.S. Pat. Nos. 6,856,575; 6,947,843; and 6,981,550 as well as the published international applications WO2004/070424; WO 2005/006020; and the published United States application US US 2005/0190649 A1.

A specific field within the area of passive seismic monitoring is the monitoring of hydraulic fracturing. Such a hydraulic fracturing operation includes pumping large amounts of fluid to induce cracks in the earth, thereby creating pathways via which the oil and gas may flow. After a crack is generated, sand or some other proppant material is commonly injected into the crack to prevent it from closing. The loose proppant filling provides a conductive pathway for the oil and gas to flow from the newly formed fracture into the wellbore.

In the field of microseismic monitoring the acoustic signals generated in the course of a fracturing operation are treated as microseismic events. However, use is made of the information available from the fracturing operation, such as timing and pressure. A well-known example of a set of microseismic data is the Carthage Cotton Valley data, evaluated for example by James T. Rutledge and W. Scott Phillips in: "Hydraulic stimulation of natural fractures as revealed by induced microearthquakes, Carthage Cotton Valley gas field, east Texas", Geophysics Vol. 68, No 2 (March-April 2003), pp. 441-452. Data relevant for this invention are found in: Rutledge, J. T., Phillips, W. S. and Mayerhofer, M. J., "Faulting induced by forced fluid injection and fluid flow forced by faulting: an interpretation of the hydraulic fracture microseismicity, Carthage Cotton Valley Gas field, Texas", Bulletin of the Seismological Society of America, Vol. 94, No. 5, pp. 1817-1830, October 2004.

SUMMARY OF THE INVENTION

Thus, it is an object of the present invention to provide a method for updating an earth model including steps of obtaining an initial earth model including surfaces bounding geological features as derived from seismic or logging measurements; obtaining microseismic data to identify surfaces bounding fractures to be included in said model; and updating mechanical attributes of an identified faults or fracture by matching a failure criterion to observed microseismic events for the identified fracture.

An earth model in accordance with the present invention includes models which are build from conventional in boreholes penetrating the earth represented by the model. Seismic measurements or logging measurements are used only as illustrative examples representative of many other types of measurements commonly used to build an accurate representation of the earth. In a preferred embodiment, the earth model represents a reservoir, parts of a reservoir, or a plurality of reservoirs. The reservoirs can be for example hydrocarbon, water or carbon dioxide reservoirs.

The term fracture includes faults and similar geological features occurring naturally or generated through human activity. These features are geometrically characterized in a model by their boundaries or bounding surfaces. Other geological features typically found in an earth model are layers.

Microseismicity or microseismic events include events generated without use of a man-made source device, though the trigger of a seismic event may well be some form of human activity in and around a wellbore such as fracturing.

Mechanical attributes includes friction angle, stress and stress states, pore pressure and similar or related attributes which can be used to characterize the mechanical properties of a geological feature such as a fracture or fault. Typical attributes may include normal and shear stress at the surfaces bounding a fracture or stress parameters related to the normal and shear stress.

In a preferred embodiment, the invention includes the step of predicting a mechanical attribute, or even more preferable, the step of prediction a time series or evolution of such an attribute.

In some applications of the invention it may be necessary to determine which fracture or set of fractures within the model can be treated for the purpose of calculating attributes and their change as being independent or isolated from other fractures or geological features.

In another preferred embodiment, the invention includes the step of registering microseismic events and recalibrating the mechanical attributes to match the registered microseismic events. The recalibration can be done on a regular or periodic schedule or be event-triggered, for example in case of a mis-match exceeding a pre-set limit.

In another preferred embodiment, the failure criterion is the Mohr-Coulomb criterion, however other failure criteria are known and could be used for the purpose of the present invention.

In another preferred embodiment measured and time-sequenced microseismic events are used as input to the earth model. An event may include for example a location and a strength parameter, such as amplitude, moment, moment tensor or moment release.

According to another aspect of the invention, there is provided a method of performing a wellbore operation with the steps of monitoring microseismic events; processing said microseismic events to determine microseismic data including location and strength related parameters; providing such parameters as input into an earth model including surfaces bounding geological features; using the microseismic data to identify fractures to be included in said model; and updating mechanical attributes of an identified faults or fracture by matching a failure criterion to observed microseismic events for the identified fracture.

The methods of the invention can be used as part of a process or operation on the reservoir represented by the model using for example outputs of the earth model as control parameters for operations such as drilling or fracturing. Hence, stress related parameters as determined by the earth model could be used as control parameters for the operation.

Other possible applications of the earth model include the use of such an earth model to increase productivity of a hydrocarbon reservoir by controlling for example fractures, the location of borehole trajectories, the control of the wellbore pressure during drilling and/or production or other relevant parameters.

A preferred example of the invention can further be seen as making use of the location and mechanism of a time indexed sequence of microseismic events and other time indexed information such as production or stimulation data, a model of the sub-surface, and any computational technique that is able to determine pore pressures and the stress state.

In one variant the method enables the spatio-temporal pattern of fault/fracture behaviour to be reliably predicted.

DETAILED DESCRIPTION OF THE INVENTION

An example of the invention is illustrated using a dataset from the Carthage Cotton Valley Field in the East Texas Basin. In 1997, microseismicity was measured during and shortly after a number of hydraulic fracture treatments.

Figure 1A:
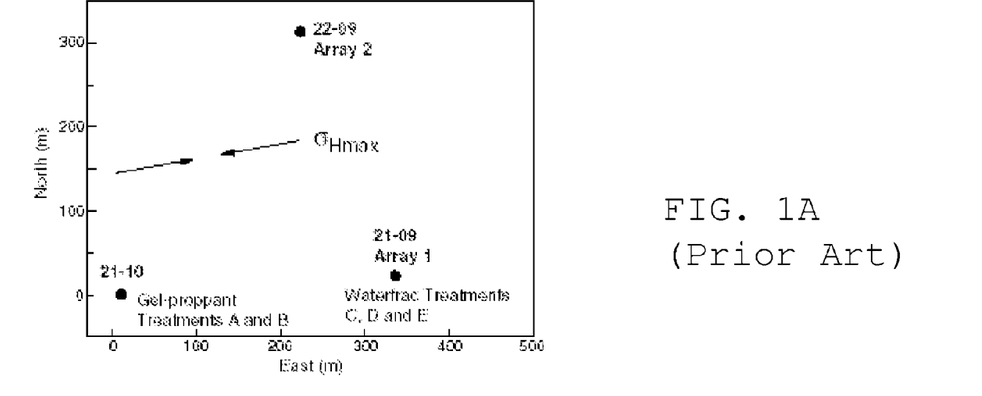
FIGS. 1A and 1B illustrate vertical and horizontal layout of one treatment well and two observation wells for treatment and measurement of microseismic events according to known methods.

FIG. 1A shows the geographical positions of some of the treatment and monitor wells. The dataset for the present example was derived from treatment B in well 21-10. During the treatment monitoring sensor arrays (Array 1 and Array 2) located in wells 21-09 and 22-09 registered microseismic activity. These monitor wells are located 337 m [1105 ft] and 385 m [1263 ft], respectively, away from the treatment well 21-10. FIG. 1A also shows the principal direction of the horizontal stress $\sigma_H$.

Figure 1B:
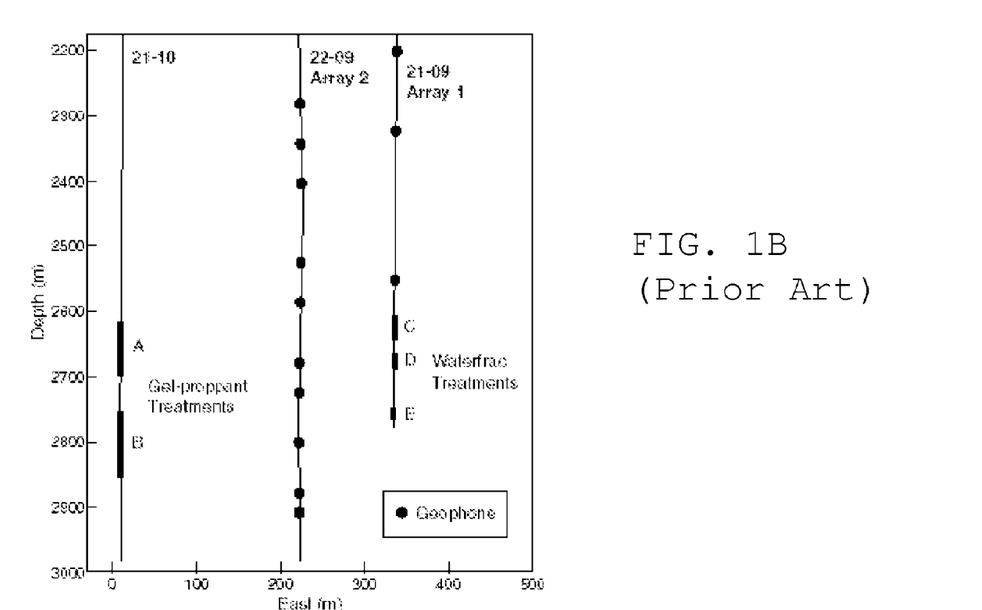

FIG. 1B shows the vertical or depth interval of the treatment B in well 21-10 and the depth of the geophones sensors in the two monitor wells 21-09 and 22-09. The depth interval of treatment B is approximately 2750 m to 2850 m [9022 ft to 9350 ft]. The graph also indicates the depth interval of another treatment labeled A at a higher section of the treatment well 21-10.

The dataset has been made available to researchers and Rutledge et al. (2002) subsequently analyzed the microseismicity during and after treatment B. The result of Rutledge's analysis is reproduced FIGS. 2 and 3.

Figure 2:
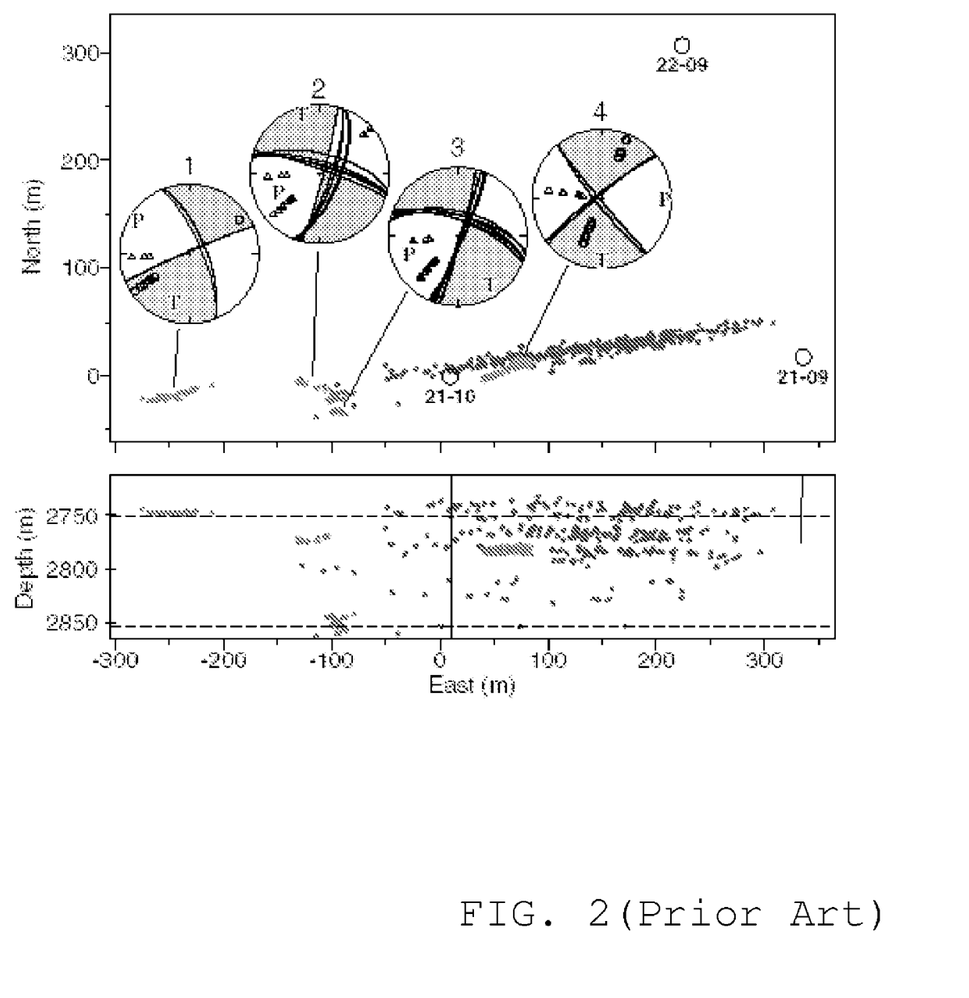
FIG. 2 shows a published chart of microseismic events showing the measured events and beachball diagrams indicating the type of focal mechanism or deformation on faults or fractures.

In FIG. 2, microseismic events are shown as dots together with beachballs indicating the type of focal mechanism or deformation on a fault or fracture. Groups of dots are clustered according to common characteristics. For the present example the focus is on the rightmost band of events stretching from −50 m to 300 m [−164 ft to 984 ft] in east-north-east direction. These events are linked to a hydraulic fracture. However within this band, cluster analysis revealed that microseismic activity is also generated by natural fractures close to the hydraulic fracture. The natural fracture denoted by the events represented as beachball 4 is of particular interest. It is shown in greater detail in FIG. 3.

Figure 3:
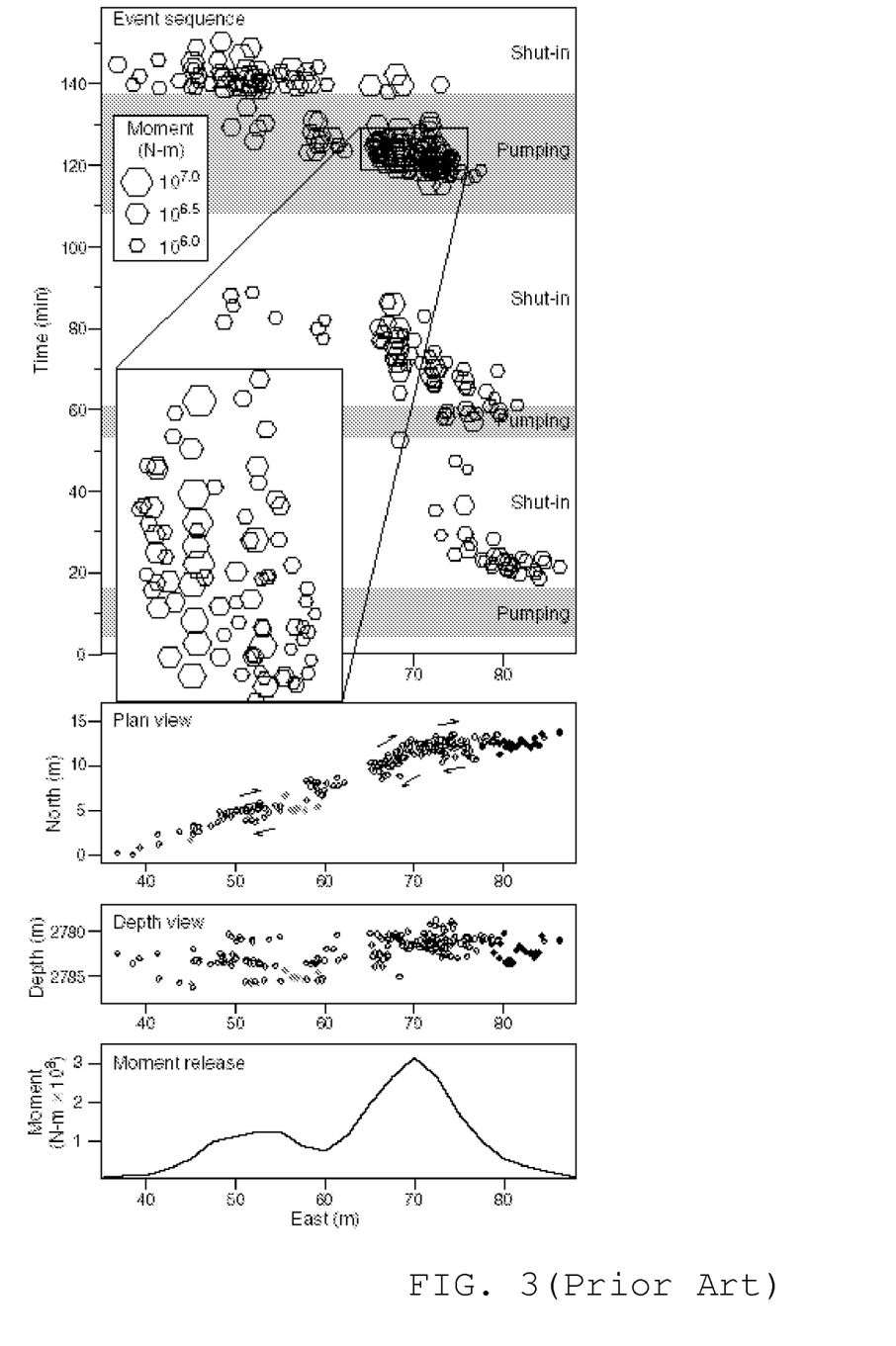
FIG. 3 show in four panels the known temporal event sequence, the plane and depth view and the moment release of a subset of the microseismic data, respectively, of a section of the events of FIG. 2 and includes insets drawings of a enlarged section of the temporal event sequence.

FIG. 3 shows in the two central panels an enlarged section of the stretch from 35 m to 90 m [115 ft to 295 ft] in eastern direction of FIG. 2. In addition to the plane and depth view of the two middle panels, the relative size or moment of the events in this interval are graphically illustrated in a top and bottom panel. The magnitude of each event is represented by its size in the panel. The ordinate of the top panel indicates the time of the event. The abscissa indicates the location of an event and is equal for all for panels.

FIG. 3 shows that microseismic activity occurs not only during pumping periods, but also during shut-in. These and also an unusual spatio-temporal microseismicity pattern in that near wellbore events occur even after a relatively long period of time. The figure also reveals a trend of increasing event magnitudes as time progresses.

Figure 4:
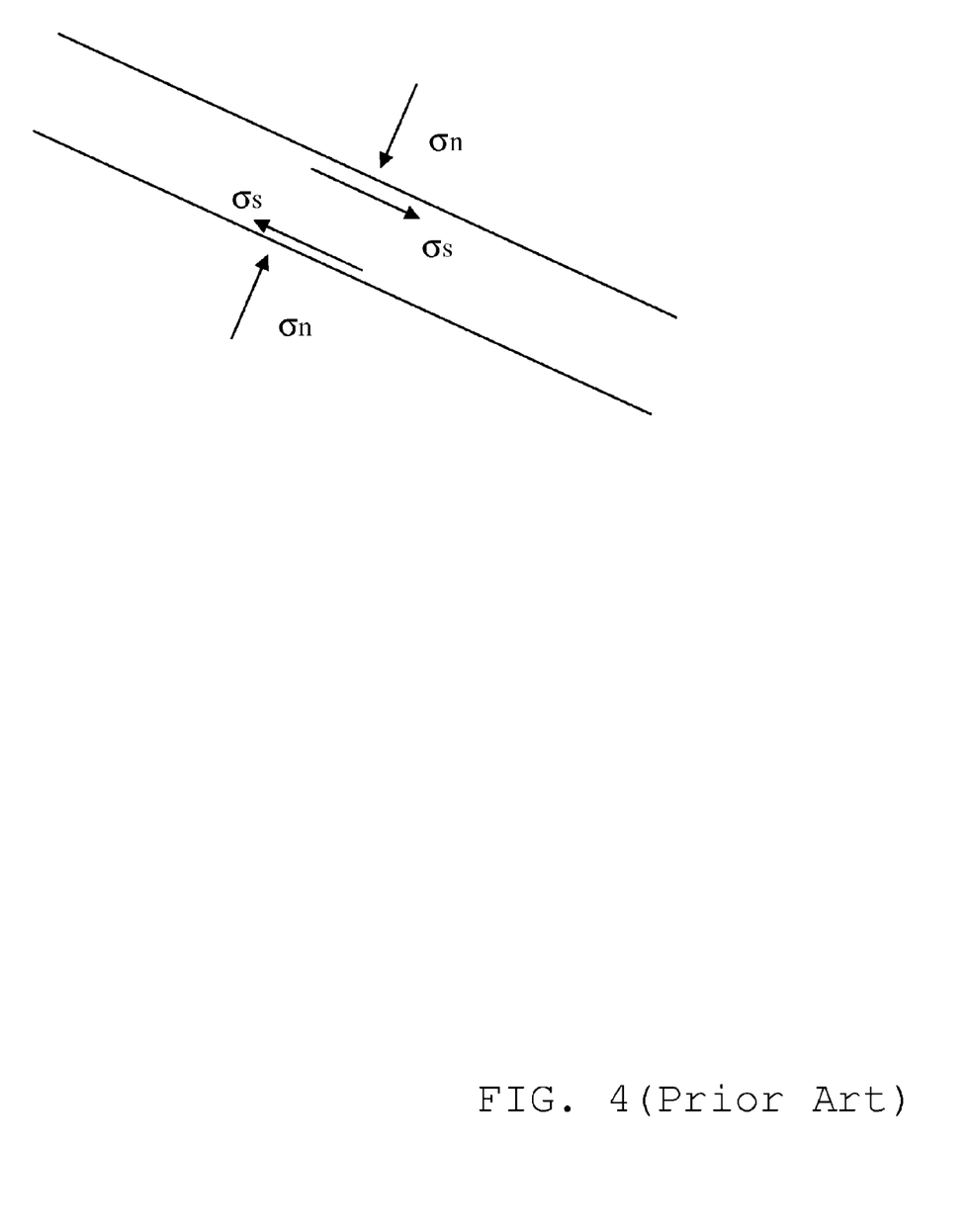
FIG. 4 illustrates known types of stress parameter.

FIG. 4 is a schematic representation of part of a fault or fracture and the (total) normal stresses $\sigma_n$ and the (total) shear stresses $\sigma_s$ along its boundaries. Whilst these stresses are convenient for illustration purposes it is understood by a skilled person that any actual calculation of stress states in an earth model may use a different set of stresses, as will be introduced below.

Figure 5A:
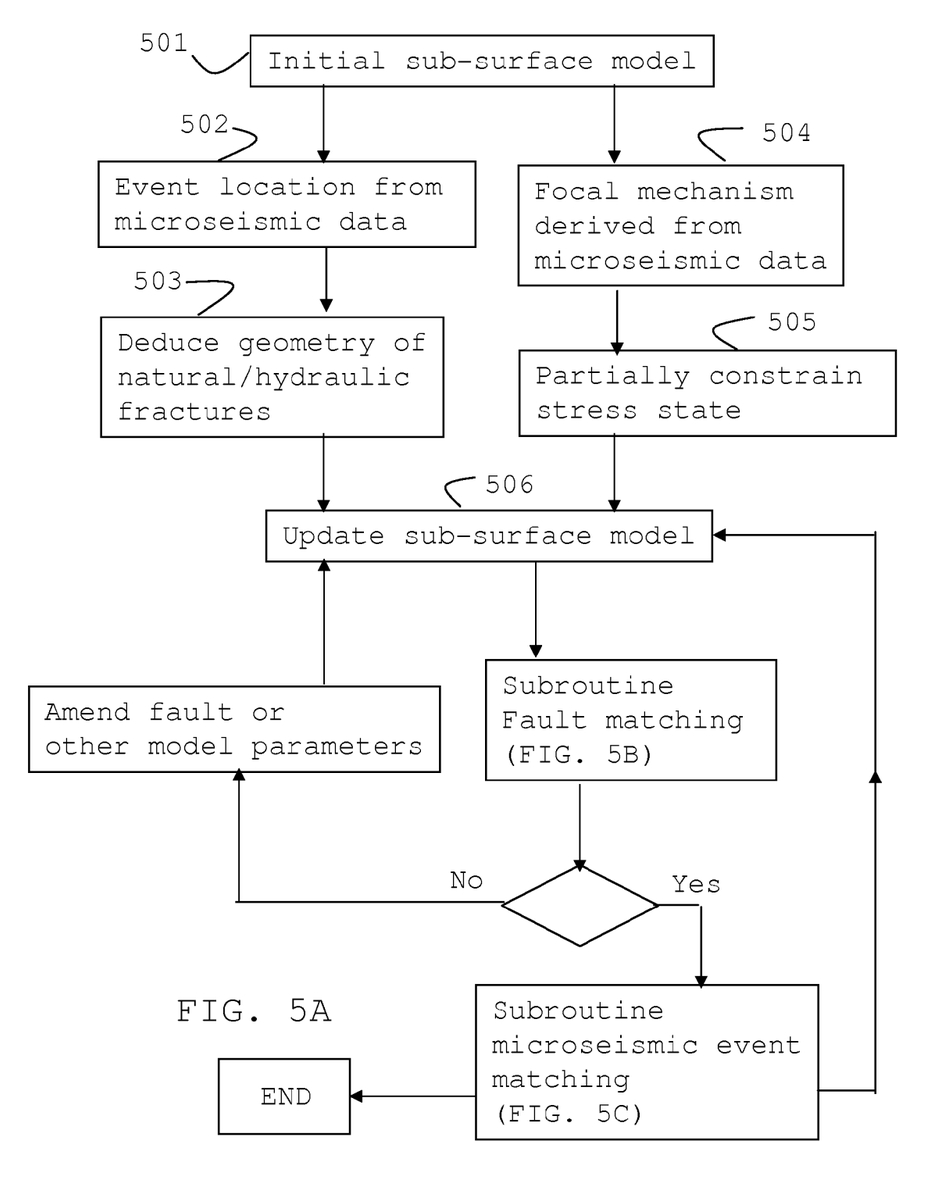
FIGS. 5A-C are part of a flow chart illustrating in greater detail a method of updating the earth model according to the present invention.
Figure 5B:
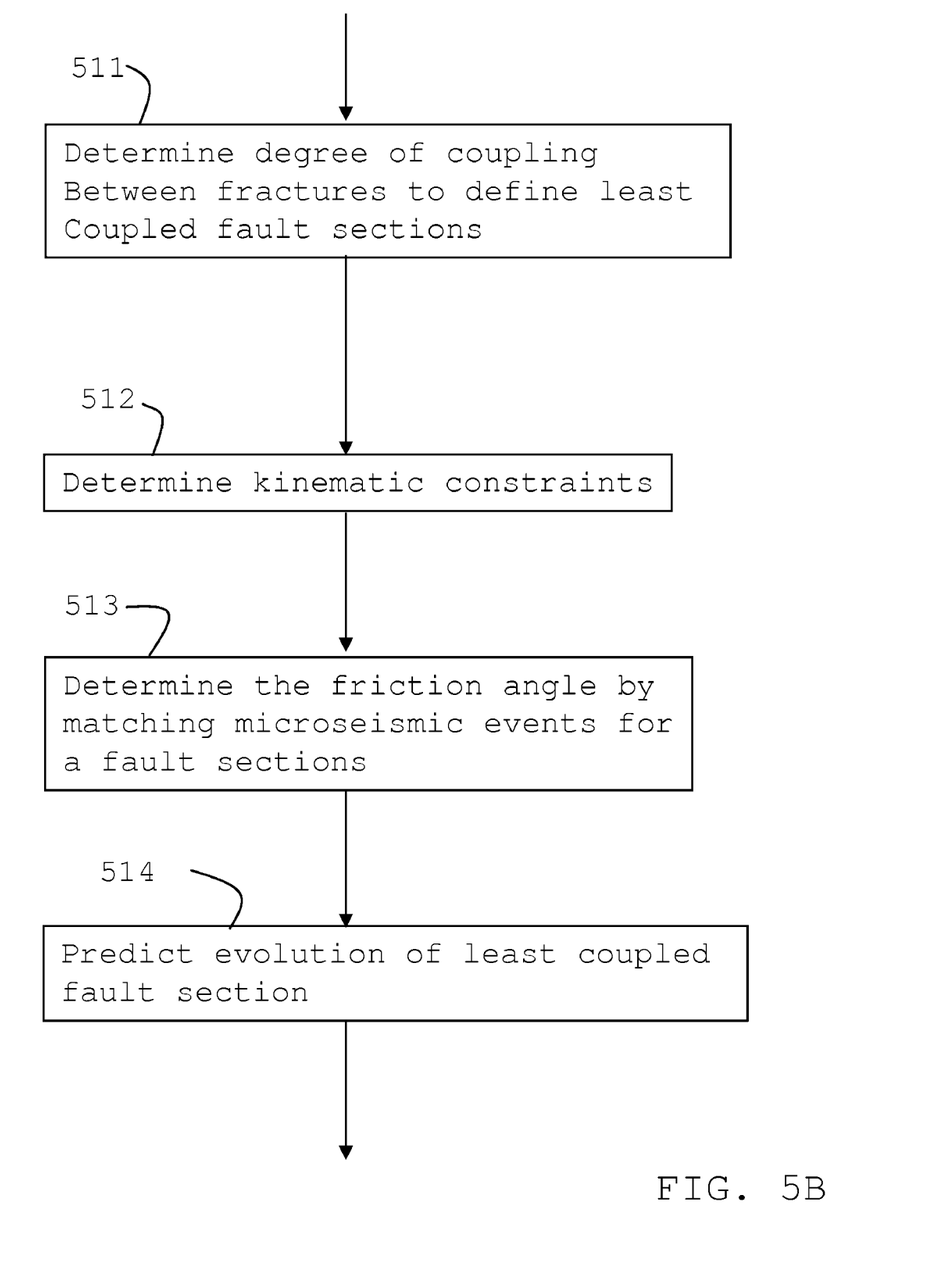

FIG. 5 shows steps in accordance with an example of the invention, with FIG. 5A illustrating initial steps. FIGS. 5A and 5B, respectively show steps which lead to a modification of result of the initial steps in the course of applying the methods.

The method as illustrated in FIG. 5A includes the step 501 of using or generation an initial earth model based on conventional, well-known methods.

Figure 6A:
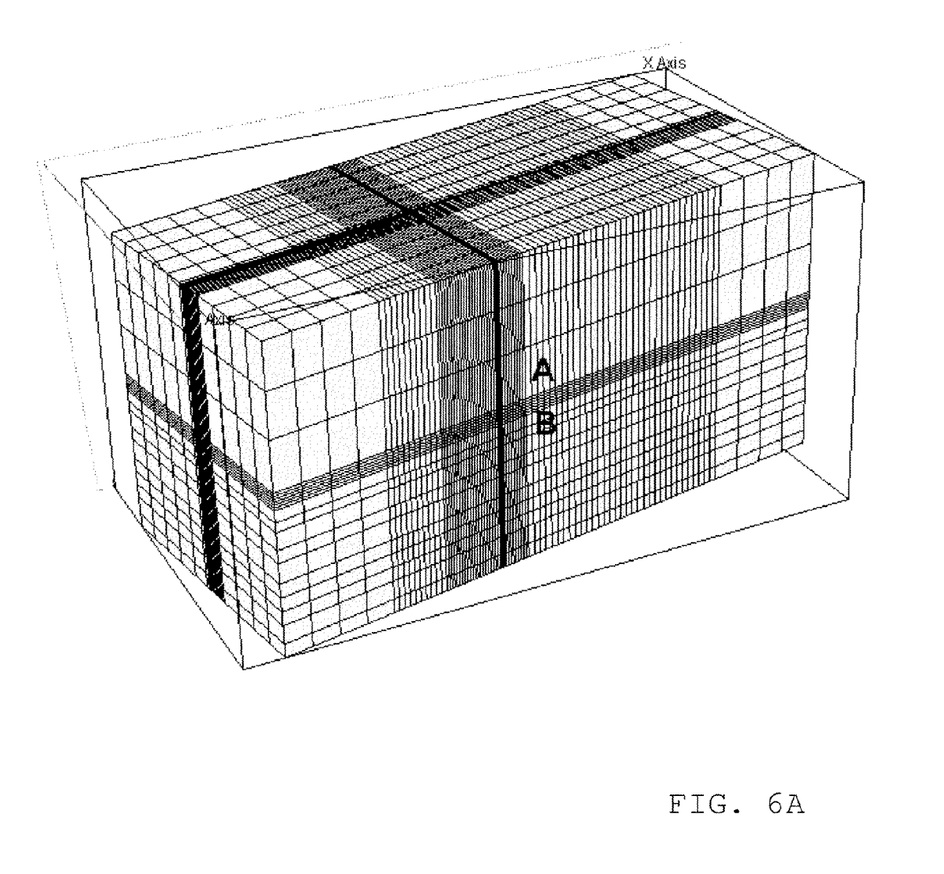
FIG. 6A is an example of a 3D graphic representation of an earth model.

As illustrated in FIG. 6A in its simplest form, an earth model is a grid with attributes assigned to each cell of the grid. It is usually build to reflect the geology, hence incorporating the layer and fault structure of a volume of earth as part of cell boundaries. The attributes may include any combination of geological and geophysical properties such as facies types, stratigraphy, pore pressure, overburden or vertical stress, stress directions, minimal and maximal horizontal stress, elastic parameters such as Young's modulus, shear modulus, Poisson's ratio, rock-strength parameter such as the unconfined compressive strength (UCS) or the friction angle and correlations such as Mohr-Couloumb criterion which link certain of the above attributes.

The source of these attributes is a plethora of known methods including seismic measurements, well logging, cuttings sampling of cuttings, cores and formation and others. A comprehensive overview of the building blocks of an earth model is given for example in Ali et al, "Watching Rocks Change—Mechanical Earth Modeling", in: the Oilfield Review, Summer 2003, pp. 22-39. A further example of the construction of an earth model is illustrated by Plumb et al. "The Mechanical Earth Model Concept and its Application to High—Risk Well Construction Projects", paper SPE 59128, presented Feb. 23-25, 2000.

Though in itself a complex undertaking, the present invention does not describe the construction of an earth model in detail and reference is made to the above-cited documents and others known in the art. In the following the existence of an initial earth model is assumed to include the following data:

1. Surfaces bounding geological features. Examples of such surfaces include formation tops and fracture or fault surfaces,
2. Constitutive parameters of the rock. These describe the mechanical response of rock under load,
3. Properties of the faults. These describe the mechanical response of a fault under load and the quantify the ability of fluids and gases to flow through it,
4. Porosity and permeability of the rock,
5. Properties of the fluids and gases occupying the pore spaces of the rock,
6. Saturations of fluids and gases in the pore spaces,
7. Pore pressure and the stress state.

As illustrated by the flow chart of FIG. 5, the initial earth model (Step 501) is then augmented in two ways. From the step of locating events 502 there is deduced the geometry of natural and/or hydraulic faults and fractures 503. The initial earth model is further enhanced by constraining 505 the stress state on the features identified in step 502 using microseismic data and/or other data such as extended leak-off tests and/or regional stress knowledge 504, for example focal mechanisms.

The data derived from the above steps are then used to update 506 the earth model of FIG. 6 with information on the locations and geometry of the fractures and any constraints on the stress states at the fractures In the following steps of FIG. 5 the mechanical properties of fault or fractures are derived in each formation where microseismicity occurs.

The invention has recognized that the behavior of an individual fault generally depends not only on its own properties but also on its coupling to other features in the earth which lie sufficiently close to it.

Hence in the example of FIG. 5B, a sensitivity analysis using the computational engine is performed. This analysis determines (i) the degree to which the behaviour of a fault or set of faults is coupled 511 to others, and (ii) the presence and location of any kinematic constraints 512.

Kinematic constraints is the term used for points, lines or surfaces which separate faults or sets of faults whose behaviour is independent of others. As part of this routine one or more faults or sections of faults are identified that are completely independent, or least dependent, on other faults.

For the one or more faults or sections of faults identified the friction angle is then determined 513 using the conditions at the time of a first observed microseismic event and the following equations:

$$N_\phi \sigma_1' - \sigma_3' = 2c\sqrt{N_\phi}, \tag{1}$$

$$\sigma_s' - \mu\sigma_N' = 0, \text{ or } \sigma_s - \mu\sigma_N = 0. \tag{2}$$

Here, $N_\phi = (1+\sin\phi)(1-\sin\phi)$ and $\mu = \tan\phi$, where $\phi$ is the friction angle and c denotes the cohesion. The maximum and minimum effective principal stresses are denoted by $\sigma_1'$ and $\sigma_3'$ respectively. The effective normal and shear stresses acting on the fault surface are denoted by $\sigma_N'$ and $\sigma_s'$ respectively. Similarly, $\sigma_N$ and $\sigma_S$ are the total normal and shear stress acting on the fault.

Equation (1) defines the conditions at which slip occurs on the fault and is known as the Mohr-Coulomb criterion. It is common to take c=0 as faults generally have little inherent strength. Equation (2) defines the frictional nature of the stresses acting on the fault; depending on the precise problem being solved or limitations of the computational engine either effective or total stress boundary conditions are used.

The iterative process for determining the friction angle 513 is as follows:
1. Estimate the friction angle,
2. Compute the shear stress acting on the fault surface using equation (2),
3. Compute the stress state over the appropriate time period to determine where and when on the relevant fault surface equation (1) is satisfied,
4. If there is mismatch between prediction and reality, amend the friction angle and return to step 2.

Once this iterative process is complete, the sub-surface model should be updated 506 with the amended friction angle.

As an alternative to equation (2), displacement boundary conditions may be applied to fault surfaces. However, this alternative method has presently the disadvantage that the resulting computations are more intensive.

Using the sub-surface model refined by the friction angle as calculated above, the stress state is computed over a defined time interval 514 to predict the time evolution of the least coupled fault section or sections. The behaviour of each fault or set of faults that is preferably decoupled from others, or failing that loosely coupled to others, is individually examined in this process step. The shear stresses acting on the fault or fault section may be adjusted so that the time and location of the predicted initial microseismic event matches reality.

It may be necessary to repeat this calibration process of FIG. 5B at sub-intervals of the time period over which predictions are being made. Such re-calibration may become necessary as understanding of the dynamics of how a fault ruptures along its length is not yet fully developed.

Figure 5C:
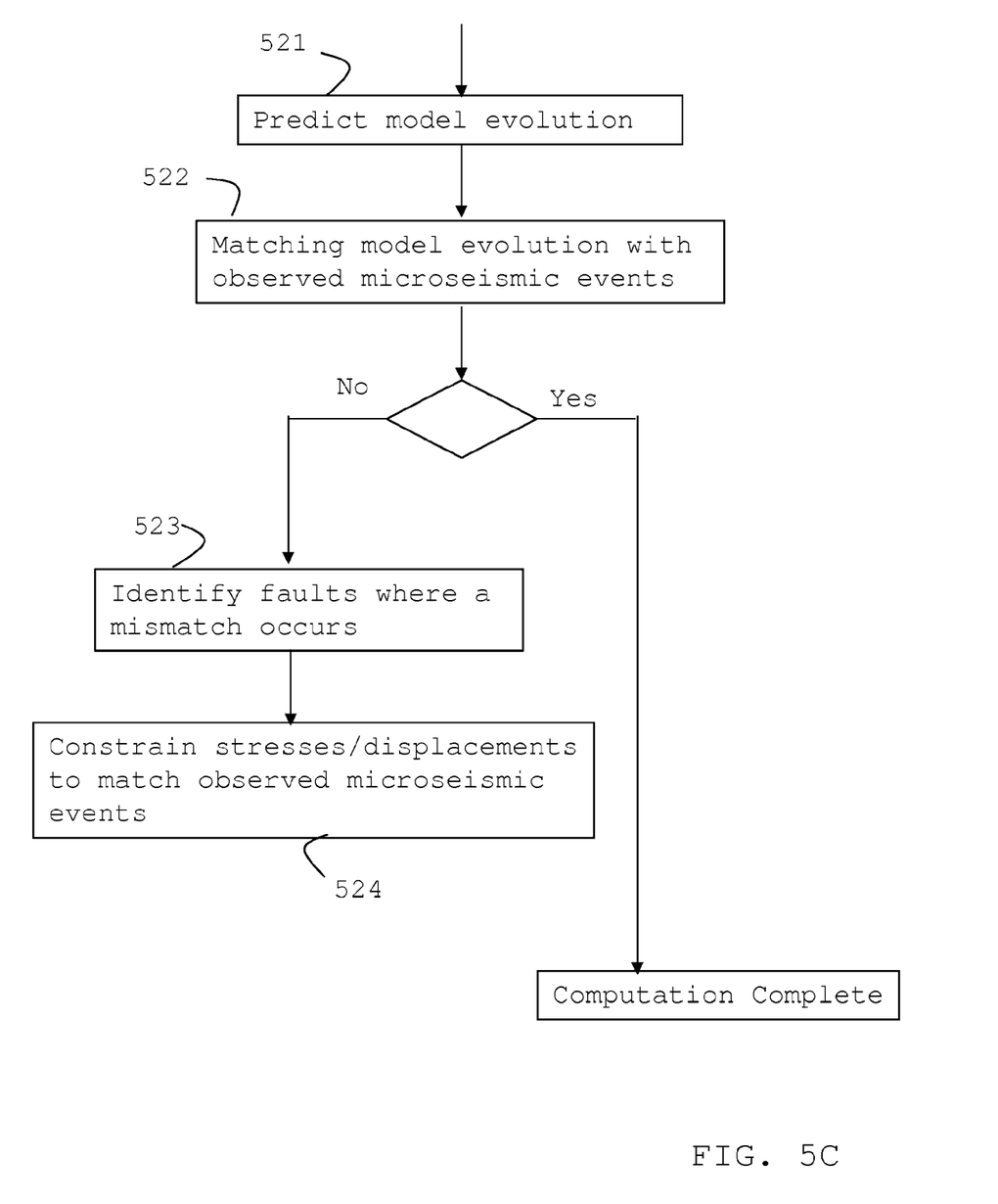

The example of FIG. 5C includes a step of recalibrating the model using microseismic events 521 at discrete points in time when the events no longer match the predicted location and size. In case no mismatch is found the computation can be regarded as being completed 522. In the event of mismatches, the faults where mismatches occur are identified 523, and the microseismic events are then evaluated in Step 524 as in the 504 and 505 above to constrain stress or displacement along the relevant faults or fault sections. Again the earth model is then updated 506 with the result of this computation.

As result of this method the state evolution of the fault/fracture system can be derived. The knowledge of present and of future attributes of the fault system including stress states can be used for example to control drilling and fracturing operations. It also allows for an enhanced understanding of the flow around and through the system thus improving the predictive capabilities of the earth model itself and any other models linked with it. Model or simulators linked to an earth model in accordance with the invention could be flow or reservoir simulators such as ECLIPSE™, a reservoir simulator commercially available from Schlumberger. Alternatively, methods and tools as described in the United States published patent application 20050234690 may be applied to link earth and reservoir model.

Figure 6B:
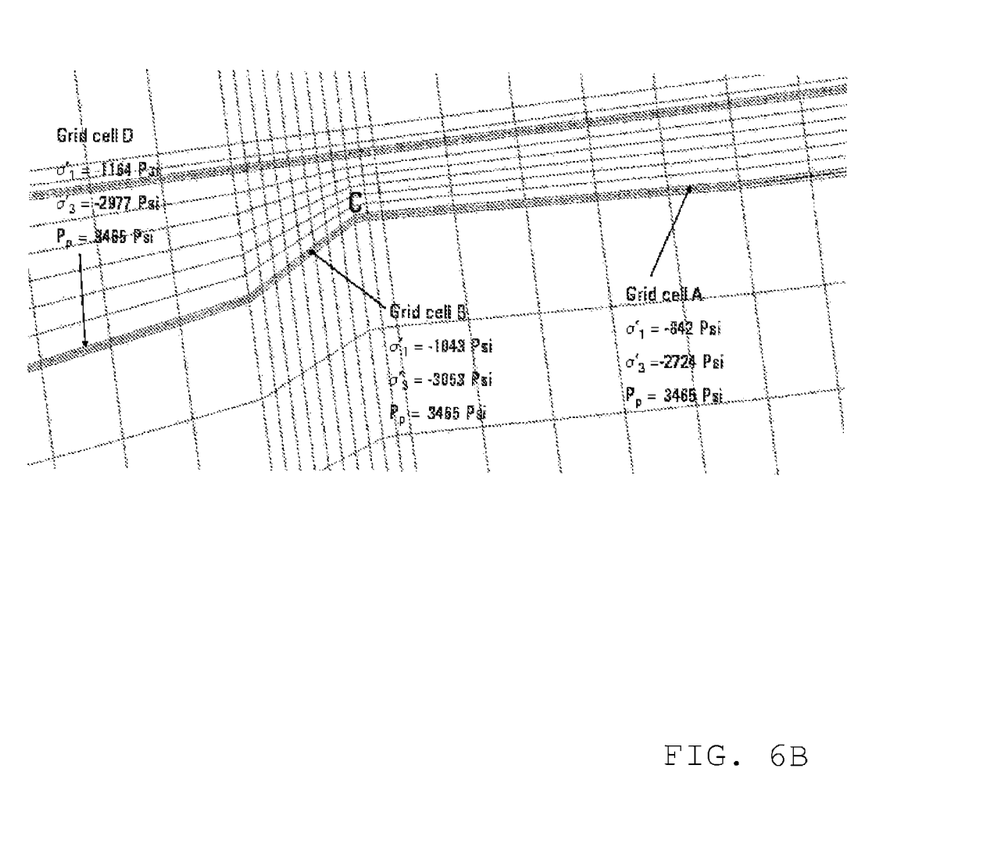
FIG. 6B is a 2D view on a section of the earth model of FIG. 6A incorporating faults as located through microseismic events.

FIG. 6A is a graphic representation of an earth model around the volume shown in FIGS. 2 and 3. Each cell shown has attributes associated with it which can be displayed using for example a color coding (not shown). In FIG. 6B a two-dimensional slice of the volume is shown indicating the position of the hydraulic fracture and the natural fault, as derived from microseismic data following the steps above and as illustrated in FIG. 5. Points A, B, C, D are specific points or cells along the fractures at which the above methods are applied and tested as described in the following. Each cell A, B, D is shown with its maximum and minimum effective principal stresses $\sigma_1'$, $\sigma_3'$, and a pore pressure value $P_p$.

Figure 7:
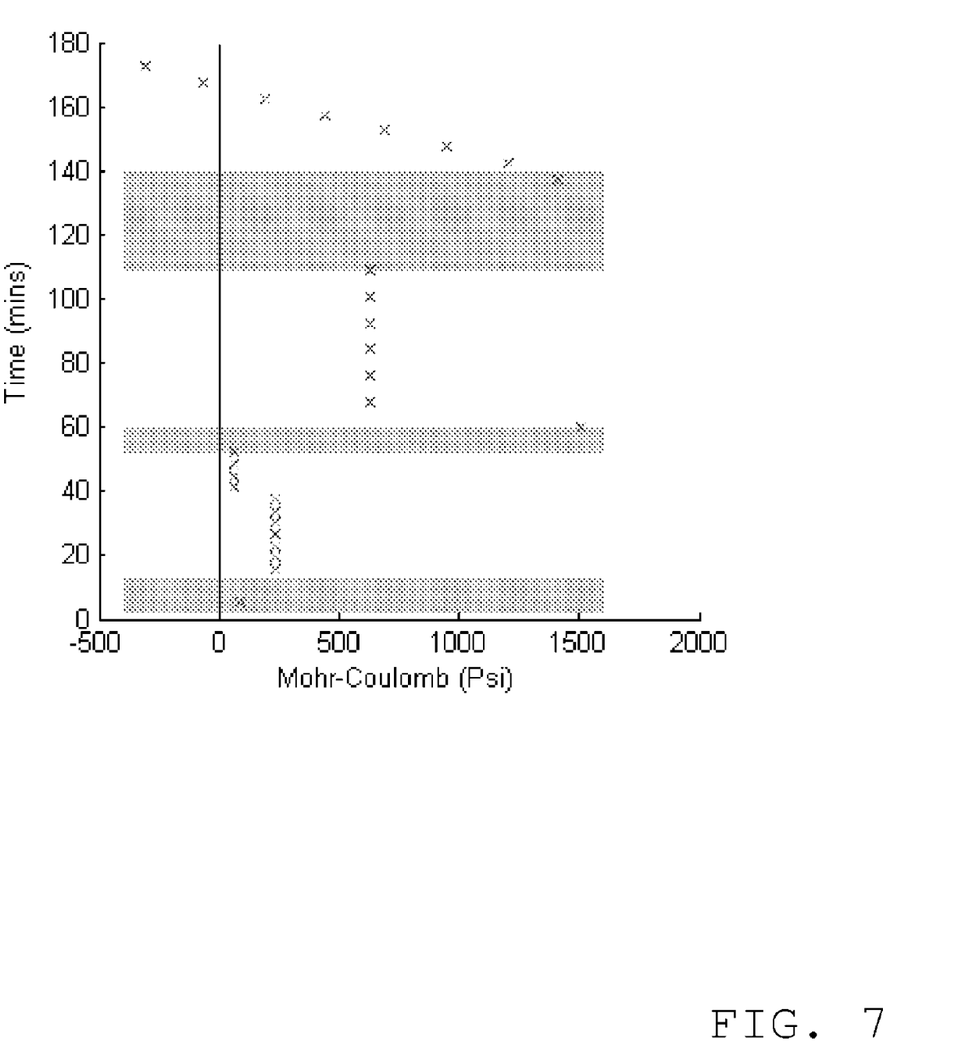
FIGS. 7 and 8 illustrate matching processes comparing predictions of a model with microseismic data.
Figure 8:
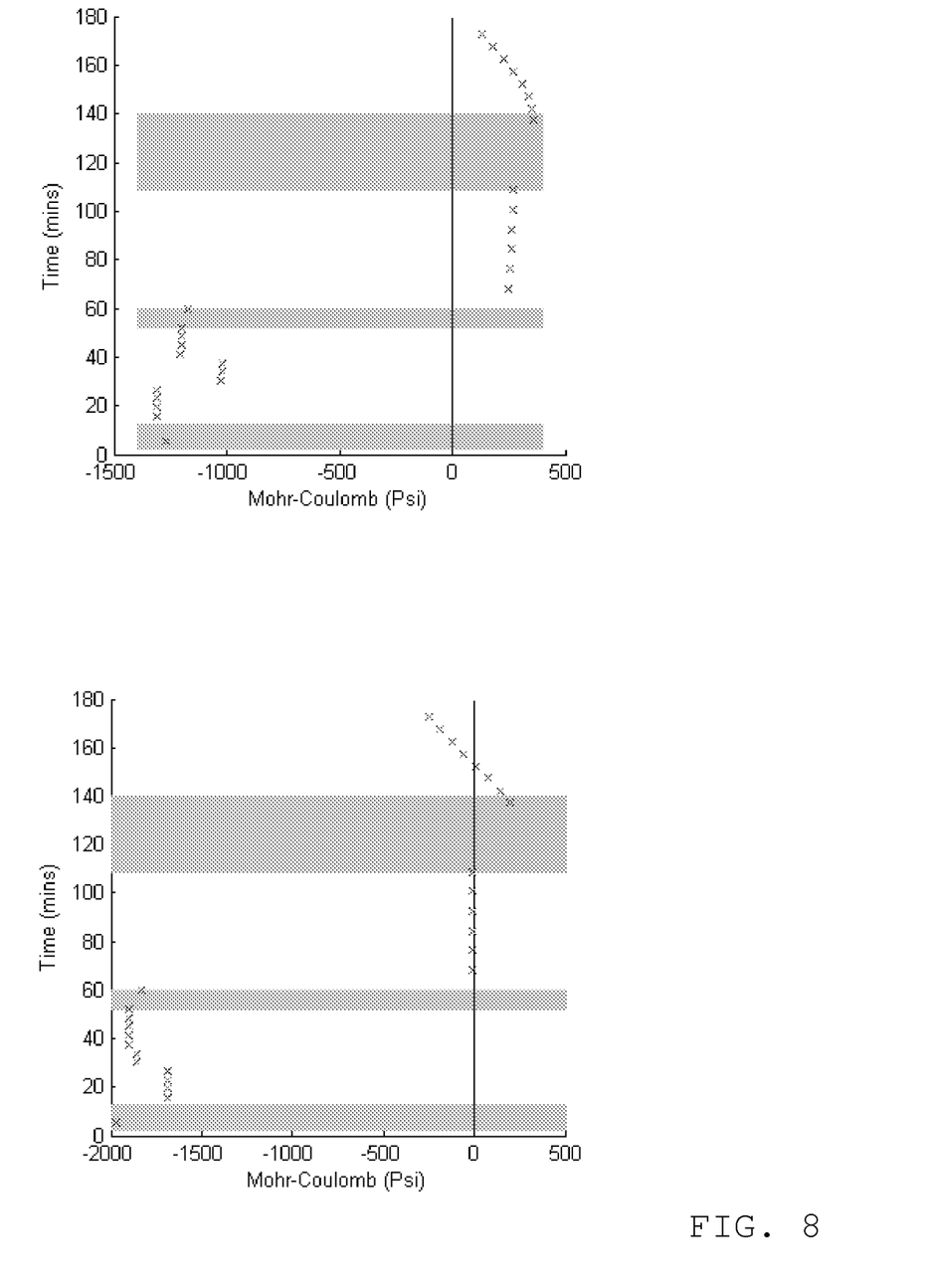

The operation of the method is now further illustrated in FIGS. 7 and 8. The data of FIG. 3 can be interpreted as a time series of microseismic events. With the knowledge derived from the sensitivity analysis it can be established that at a position 70 m [230 ft], indicated as point C in FIG. 6B, there is a kinematic constraint isolating the natural fault to the west of this point from the part of the hydraulic fracture further to the east. The behaviour of the fault to the right of this point C is therefore taken to be independent of the boundary conditions applied to the faults to the left of it, and vice versa.

To calibrate the friction angle, it is necessary to take the first microseismic event observed in the region to the right of point C, which is annotated as point A in FIG. 6B, and iteratively apply equations (1) and (2) until the location and time of initial predicted failure matches reality. This process indicates that the friction angle is 27.5°. The Mohr-Coulomb criterion is then plotted at point A on the natural fracture which is 72 m updip of well 21-10. If the Mohr-Coulomb functional (i.e., the left hand side of equation (1)) is positive, then slip will occur. Larger values of the Mohr-Coulomb functional imply a higher stress intensity and hence a microseismic event of higher magnitude once slip occurs. If the Mohr-Coulomb functional is negative then slip will not occur.

Using the Mohr-Coulomb criterion the model output shown in FIG. 7 gives rise at point A to a series of events the strength of which matches qualitatively the data of FIG. 3. Between the first and second pumping interval the model predicts a series of smaller events, which grow in strength during the second shut-in period and reach a maximum during the third pumping interval to taper off in the last shut-in interval. Thus, it readily observable that the predicted times and magnitudes of slip qualitatively matches the microseismic data.

FIG. 8 shows similar predictions for the two points B, D to the left of point C. In this region, the first observed microseismic event, must be used to calibrate the shear stress. After this the predicted times and magnitudes of slip again qualitatively match the microseismic data.

While preferred embodiments of the invention have been described, the descriptions and examples are merely illustrative and are not intended to limit the present invention.

The invention claimed is:

1. A method for updating an earth model relating to a portion of the earth's sub-surface in a computer readable medium comprising:
    obtaining an earth model in a computer readable medium, said model including surfaces bounding geological features wherein the geological features are faults or fractures and the model also includes mechanical attributes of the faults or fractures;
    obtaining time-sequenced microseismic data by receiving acoustic waves caused by microseismic events which are movement of the earth's sub-surface at a plurality of locations below ground;
    using the microseismic data to identify one or more faults or fractures;
    processing the microseismic data to determine location and strength related parameters;
    providing such parameters as an input into the earth model, and
    updating mechanical attributes of an identified fault or fracture in the earth model.

2. The method of claim 1 further comprising the step of predicting the mechanical attributes.

3. The method of claim 1 further comprising a step of predicting a time evolution of the mechanical attributes, and comprising the step of determining faults or fractures to be treated as independent for the purpose of predicting the time evolution of the mechanical attributes.

4. The method of claim 1 further comprising the step of registering microseismic events and recalibrating the mechanical attributes to match the registered micro seismic events.

5. The method of claim 1 wherein one of the mechanical attributes is friction angle.

6. The method of claim 1 wherein one of the mechanical attributes is a stress related parameter.

7. The method of claim 1 wherein the mechanical attributes includes normal and shear stress at the surfaces bounding a fracture or stress parameters related to the normal and shear stress.

8. The method of claim 1 wherein the mechanical attributes includes friction angle and a stress related parameter.

9. The method of claim 1 wherein the step of obtaining microseismic data by receiving acoustic waves comprises receiving the acoustic waves at a plurality of monitoring sensors.

10. The method of claim 1 wherein updating mechanical attributes of an identified fault or fracture in the earth model comprises altering attributes recorded in the model such that a calculated failure criterion matches observed microseismic events for the identified fault or fracture.

11. The method of claim 10 wherein the failure criterion is the Mohr-Coulomb criterion.

12. Method of performing a wellbore operation comprising
obtaining an initial earth model in a computer readable medium, said model including surfaces bounding geological features wherein the geological features are faults or fractures and the model also includes mechanical attributes of the faults or fractures;
monitoring microseismic events, said microseismic events being movement of a geological formation at a plurality of locations below ground, said movements generating acoustic waves;
processing said microseismic events to determine microseismic data including location and strength related parameters;
providing such parameters as input into the earth model;
using the microseismic data to identify one or more faults or fractures; and
updating mechanical attributes of an identified fault or fracture in the earth model.

13. The method of performing a wellbore operation in accordance with claim 12, further comprising the step of using outputs of the earth model as control parameters for the wellbore operation.

14. The method of performing a wellbore operation in accordance with claim 12, further comprising the step of using stress related parameters as determined by the earth model as control parameters for the wellbore operation.

15. The method of performing a wellbore operation in accordance with claim 12, wherein the wellbore operation is drilling or fracturing.

16. The method of claim 11 wherein one of the mechanical attributes is friction angle.

17. The method of claim 12 wherein the mechanical attributes include friction angle and a stress related parameter.

18. The method of claim 12 further comprising the step of registering microseismic events and recalibrating the mechanical attributes to match the registered microseismic events.

19. The method of claim 12 wherein updating mechanical attributes of an identified fault or fracture in the earth model comprises altering attributes recorded in the model such that a calculated failure criterion matches observed microseismic events for the identified fault or fracture.

20. The method of claim 19 wherein the failure criterion is the Mohr-Coulomb criterion.

21. Method of performing a wellbore operation comprising the steps of:
obtaining an earth model relating to a portion of the earth's sub-surface in a computer readable medium, said model including surfaces bounding geological features wherein the geological features are faults or fractures and the model also includes mechanical attributes of the faults or fractures;
obtaining time-sequenced microseismic data by receiving acoustic waves caused by microseismic events which are movement of the earth's sub-surface at a plurality of locations below ground;
using the microseismic data to identify one or more faults or fractures;
processing the microseismic data to determine location and strength related parameters; and
using the parameters as an input to the earth model, to update mechanical attributes of an identified fault or fracture by registering microseismic events and recalibrating the mechanical attributes recorded in the model to match the registered microseismic events; and
using outputs of the earth model as control parameters for the wellbore operation.

22. The method of claim 21, wherein the wellbore operation is drilling or fracturing.

23. The method of claim 21 wherein the mechanical attributes include friction angle and a stress related parameter.

24. The method of claim 21 wherein the step of obtaining microseismic data by receiving acoustic waves comprises receiving the acoustic waves at a plurality of monitoring sensors.

25. A non-transitory computer readable medium containing an earth model relating to a portion of the earth's sub-surface obtained and updated by the steps of:
obtaining an earth model in the non-transitory computer readable medium, said model including surfaces bounding geological features wherein the geological features are faults or fractures and the model also includes mechanical attributes of the faults or fractures;
obtaining time-sequenced microseismic data by receiving acoustic waves caused by microseismic events which are movement of the earth's sub-surface at a plurality of locations below ground;
using the microseismic data to identify one or more faults or fractures;
providing such parameters as an input into the earth model, and
updating mechanical attributes of an identified fault or fracture in the earth model.

26. Method of performing and monitoring a hydraulic fracturing operation comprising
obtaining an earth model in a computer readable medium, said model including surfaces bounding geological features wherein the geological features are faults or fractures and the model also includes mechanical attributes of the faults or fractures;
pumping fluid into a wellbore to create at least one fracture below ground and cause microseismic events which are movement of a geological formation at a plurality of locations below ground, said movement generating acoustic waves without man-made source devices at said locations;
receiving acoustic waves from the microseismic events at a plurality of monitoring sensors;
processing said microseismic events to determine microseismic data including location and strength related parameters;
providing such parameters as input into the earth model;
using the microseismic data to identify one or more faults or fractures; and
updating mechanical attributes of an identified fault or fracture in the earth model.

27. The method of claim 26 wherein the mechanical attributes include friction angle and a stress related parameter.

28. The method of claim 26 wherein the mechanical attributes include normal and shear stress at the surfaces bounding a fracture or stress parameters related to the normal and shear stress.

29. The method of claim 26 further comprising the step of registering microseismic events and recalibrating the mechanical attributes to match the registered microseismic events.

30. The method of claim 26 wherein updating mechanical attributes of an identified fault or fracture in the earth model comprises altering attributes recorded in the model such that a calculated failure criterion matches observed microseismic events for the identified fault or fracture.

31. The method of claim 30 wherein the failure criterion is the Mohr-Coulomb criterion.

* * * * *